United States Patent [19]

Moran

[11] 4,028,678

[45] June 7, 1977

[54] MEMORY PATCHING CIRCUIT

[75] Inventor: John Christian Moran, Broomfield, Colo.

[73] Assignee: Bell Telephone Laboratories, Incorporated, Murray Hill, N.J.

[22] Filed: Oct. 16, 1975

[21] Appl. No.: 623,133

[52] U.S. Cl. .......................................... 340/172.5
[51] Int. Cl.[2] ...................................... G06F 13/00
[58] Field of Search ............................... 340/172.5

[56] References Cited

UNITED STATES PATENTS 3,934,227  1/1976  Worst ............................ 340/172.5

Primary Examiner—Gareth D. Shaw
Assistant Examiner—C. T. Bartz
Attorney, Agent, or Firm—Donald M. Duft

[57] ABSTRACT

A read only memory (ROM) patching arrangement is disclosed which provides valid output information whenever ROM locations containing invalid information are addressed. The disclosed arrangement detects the receipt of each ROM address word representing a defective location, temporarily inhibits the output of the ROM, and causes a small auxiliary PROM to output valid information as a substitute for that in the defective ROM location. Decoder circuitry is disclosed which uses a minimum number of small capacity PROMs to detect a limited number of ROM addresses to be patched.

10 Claims, 5 Drawing Figures

FIG. 2

| PATCH NO. | ADDRESS BITS A3 A2 A1 A0 | PROM 1 OUTPUT BITS 7 6 5 4 3 2 1 0 |
|---|---|---|
| 0 | 0 0 0 1 | 0 0 0 0 0 0 0 1 |
| 1 | 0 0 1 1 | 0 0 0 0 0 0 1 0 |
| 2 | 0 0 1 0 | 0 0 0 0 1 1 0 0 |
| 3 | 0 0 1 0 | 0 0 0 0 1 1 0 0 |
| 4 | 0 1 0 1 | 0 0 0 1 0 0 0 0 |
| 5 | 0 1 1 0 | 0 0 1 0 0 0 0 0 |
| 6 | 1 0 0 1 | 0 1 0 0 0 0 0 0 |
| 7 | 0 1 1 1 | 1 0 0 0 0 0 0 0 |

FIG. 3

| PATCH NO. | ADDRESS BITS A7 A6 A5 A4 | PROM 2 OUTPUT BITS 7 6 5 4 3 2 1 0 |
|---|---|---|
| 0 | 0 0 1 0 | 0 0 0 0 0 0 0 1 |
| 1 | 0 1 1 0 | 0 0 0 0 0 0 1 0 |
| 2 | 0 1 0 0 | 0 0 0 0 0 1 0 0 |
| 3 | 0 0 0 1 | 0 0 0 0 1 0 0 0 |
| 4 | 1 0 1 0 | 0 0 0 1 0 0 0 0 |
| 5 | 1 1 0 0 | 0 0 1 0 0 0 0 0 |
| 6 | 0 0 1 1 | 0 1 0 0 0 0 0 0 |
| 7 | 0 1 1 1 | 1 0 0 0 0 0 0 0 |

FIG. 4

| PATCH NO. | ADDRESS BITS A11 A10 A9 A8 | PROM 3 OUTPUT BITS 7 6 5 4 3 2 1 0 |
|---|---|---|
| 0 | 0 1 0 0 | 0 0 0 0 0 0 0 1 |
| 1 | 1 1 0 0 | 0 0 0 0 0 0 1 0 |
| 2 | 1 0 0 0 | 0 0 0 0 0 1 0 0 |
| 3 | 0 0 1 0 | 0 0 0 0 1 0 0 0 |
| 4 | 0 1 0 1 | 0 0 0 1 0 0 0 0 |
| 5 | 1 0 0 1 | 0 0 1 0 0 0 0 0 |
| 6 | 0 1 1 0 | 0 1 0 0 0 0 0 0 |
| 7 | 1 1 1 1 | 1 0 0 0 0 0 0 0 |

FIG. 5

| PATCH NO. | PROM 3 | DECIMAL INPUTS PROM 2 | PROM 1 |
|---|---|---|---|
| 0 | 4 | 2 | 1 |
| 1 | 12 | 6 | 3 |
| 2 | 8 | 4 | 2 |
| 3 | 2 | 1 | 2 |
| 4 | 5 | 10 | 5 |
| 5 | 9 | 12 | 6 |
| 6 | 6 | 3 | 9 |
| 7 | 15 | 7 | 7 |

MEMORY PATCHING CIRCUIT

BACKGROUND OF THE INVENTION

1. Field of the Invention

This invention relates to a patching facility for unalterable memories of the type used in electronic computers and processors. More particularly, the invention relates to a memory patching facility which furnishes good output information whenever an attempt is made to access word locations containing defective or invalid information in an unalterable memory.

2. Description of the Prior Art

It is known to use unalterable read only memories (ROMs) in processors, computers, and other such applications requiring the storage of permanent type information. Although ROMs, in particular semiconductor ROMs, are efficient unalterable information storage devices, their use presents problems whenever it becomes necessary to change the stored information. For example, a machine using a ROM may be manufactured, tested, delivered, installed in service, and perform satisfactorily for an extended period of time. A machine malfunction may subsequently occur due to defective program information in the ROM. This defective information may be due either to a subtle defect in the program as originally written; or it may be a newly developed defect within the ROM device.

In view of the above, it is a common problem for program errors to be discovered in ROM controlled machines and for the owner of the machine to be faced with the problem of promptly correcting the error to minimize the machine downtime.

This problem could be easily solved if the realities of semiconductor ROM technology and economics were of no concern. Conceivably, the problem could be solved by replacing the defective ROM with a new ROM programmed with the correct information. However, this solution is neither feasible nor economical. First of all, the typical semiconductor ROM can only be programmed at the factory with the programming comprising a portion of the manufacturing process. Consequently, a machine user cannot promptly obtain a newly programmed ROM. Instead he must contact the ROM manufacturer, give the manufacturer the corrected program information, and then wait for the manufacturer to produce and deliver the new ROM. Also, because the ROM programming is done by the manufacturer on a customized basis, a manufacturer cannot economically produce one or two new ROMs for a single customer. ROM's are economical only when fabricated in reasonably large quantities. For these reasons, the downtime of a machine cannot normally be minimized by replacing a defective ROM with a new one having corrected program information.

Field programmable ROMs (PROMs) are commercially available for immediate delivery. Conceivably, an installed machine having a defective ROM could be returned to service by programming a PROM with good information, and by then replacing the defective ROM with the newly programmed PROM. This would be technically feasible, but economically unsatisfactory, for most applications. The reason for this is that PROM devices are approximately ten times the cost of comparable ROMs. This expedient might be satisfactory, in spite of the economic penalty, in installations where the cost of the PROM is low compared to the cost to the user of the down condition of the machine. However, many installations could not tolerate the cost penalty. For example, a telephone company or a computer manufacturer having thousands of machines in service possibly could not afford the mass replacement of defective ROMs with PROMs costing ten times as much.

Attempts have been made in the prior art to solve the problem of defective information in unalterable memories. Most of the prior art solutions require the use of equipment that is complicated and expensive, such as the provision of a fully duplicated memory system. One prior art arrangement comprises a decoder which detects the receipt of each memory address word specifying a defective ROM location, generates a control signal to inhibit the output of the defective ROM, and activates an alterable auxiliary memory which then supplies valid program information. A system of this type is shown in U.S. Pat. No. 3,638,194 issued on Jan. 25, 1972 to Matushita et al.

Matushita uses a diode matrix array as the auxiliary memory. This memory can be field programmed by inserting diodes into sockets of the matrix crosspoints required to generate the new program information. The Matushita system may be suitable for use in application where space is not at a premium and where the ROM is of limited capacity. However, it is unsuitable with present state of the art systems using integrated circuits including ROMs and other such devices of the postage stamp size where space is at a premium. Also, the Matushita arrangement would be costly for use with a large capacity ROM since the auxiliary memory presumably would have to have the same bit capacity as the defective ROM. In this case it would merely comprise another duplicated memory arrangement.

It is therefore, a problem to maintain program controlled machines in service when program defects are discovered in the ROMs of such machines.

SUMMARY OF THE INVENTION

Objects

An object of the invention is to provide memory patching facilities for stored program controlled machines using ROMs.

A further object is to provide memory patching facilities which are activated to output good information whenever ROM word locations containing defective information are addressed.

SUMMARY DESCRIPTION

The present invention comprises an improved patching facility for ROMs. The provided equipment includes a PROM decoder for detecting the receipt of address words representing defective ROM locations and for generating an output signal uniquely identifying each such address word, a small capacity auxiliary memory for storing the valid program information that is to be used in place of that in the defective ROM locations, and an encoder interposed between the decoder and the auxiliary memory for addressing the memory whenever a decoder output is received specifying a ROM location that is to be patched.

The inputs of the PROM decoder and the ROM are both connected to the memory address bus of the system of which the ROM is a part. The decoder thereby receives each address word applied to the ROM, detects the receipt of each word representing a defective ROM location and generates an output signal identifying the defective location. This signal is in 1-out-of-$n$ form and it is applied to the one of the plurality of decoder output conductors that is associated with the patched address. Each output conductor is unique to a different defective ROM location that is to be patched. The encoder receives this 1-out-of-$n$ signal, converts it to binary and transmits the binary information to the auxiliary memory as address information. This binary information specifies the word location in the auxiliary memory that stores the valid program information that is to be used in place of that in the defective ROM location.

The encoder also generates a gating signal whenever an output signal is received from the decoder. This gating signal inhibits the output of the ROM and activates the output of the auxiliary memory so that the good information stored in the auxiliary memory will be used by the system at this time in place of that defective ROM location.

A significant advantage of the invention is that the decoder uses a plurality of small capacity PROMs to decode the ROM address information on a multiconductor system address bus and to provide a unique output signal for each detected ROM address word associated with a defective ROM location. For example, let it be assumed that there are 12 conductors in the system address bus extending to the inputs of the ROM. In this case, one possible embodiment of the invention could comprise three 16 × 8 PROMs in the decoder to provide eight patches i.e., facilities for detecting eight different 12-bit ROM address words representing eight defective ROM locations. The term 16 × 8 specifies that each PROM has 16 different 8-bit word locations.

Each such PROM has four address inputs with each input being connected to a different conductor of the 12 bit system address bus. The four inputs of the first PROM are illustratively connected to the first four address bus conductors, the four inputs of the second PROM are illustratively connected to the next four address bus conductors, and the four inputs of the third PROM are illustratively connected to the last four bus conductors. Each PROM stores 8-bit words, each PROM has eight output conductors, and the eight output conductors of each PROM are wired in parallel to the corresponding output conductors of the other PROMs.

PROM 1, the first PROM, is programmed so that a 1 is written into the first bit position of the word location in the PROM that is addressed by bits 0 through 3 of the address of the first ROM word to be patched. Likewise, a 1 is written into the first bit position of the word location in PROM 2 that is addressed by bits 4 through 7 of the address of the first ROM word to be patched. This procedure is repeated with respect to PROM 3 using address bus bits 8 through 11.

The operation of the circuit is such that all PROMs output an 8-bit word having a 1 in the same bit position whenever the address of a ROM location to be patched is received from the system address bus. Each output bit corresponds to one possible patch and the paralleled PROM outputs provide a 1-out-of-8 code identifying each patch. The paralleling of the corresponding output conductors of each PROM comprises a hardwired AND circuit so that each parallel output conductor can go high only when a 1 appears in the corresponding bit position of each PROM for the currently addressed word. With this arrangement, when the first patched ROM address appears on the system address bus, all three PROM's will have a 1 in the first or least significant bit position, the output conductor for this bit position in each PROM will go high, and this high signal will signify the reception of the first patched address word.

Each decoder output signal is applied in 1-out-of-8 form to the encoder and converted into a 3-bit binary word. The binary word is then applied as address information to the auxiliary memory to specify the word location in the memory that is to be used at this time in place of the defective information in the ROM.

When a ROM address which has not been patched is received, the paralleled PROM outputs are zero for all bit positions (bit orders) since, at this time, a 1 does not appear in any of the corresponding bit orders for all PROMs. This holds all of the eight paralleled decoder output conductors at a low or 0 potential and indicates that the received address word has not been patched. The system then uses the information stored in the currently addressed ROM location.

A given address bit pattern received by one or two of the PROMs may appear in more than one patch. In that case, the PROM involved will have a 1 written into each bit position corresponding to the patches in which the pattern is found. For example, if the address bus bits 0 through 3 are 1101 for patches 1, 3 and 7, then PROM 1 will have a 1 written into the first, third, and seventh bits of the word in PROM 1 that is addressed by the bit pattern 1101 being applied to its four inputs.

The present arrangement is limited to $n$ output patches where $n$ is the number of bit orders of each PROM. The use of a plurality of PROMs of relatively low capacity, such as three 16 × 8 PROMs, is economically preferable over the use of a single PROM having a number of inputs equal to the number of conductors in the address bus. The cost of PROMs is related to their bit capacity. A PROM having 12 input conductors would have 4,096 ($2^{12}$) word locations. The use of three small PROMs is cheaper since a PROM having four address conductors will have only 16 ($2^4$) word locations; and the three decoder PROMs together will have only 48 word locations. The cost savings for this alternative arrangement is approximately proportional to the number of word locations. Thus the use of a single PROM having 12 input conductors and 4,096 words would be costlier than the use of only three PROMs and 48 words by a factor of 4,096 to 48 or about 85. This is a significant cost reduction and the use of the PROMs in this manner permits the disclosed patching arrangement to be economically feasible and preferable to the physical replacement of the defective ROM or the use of other and more complicated solutions to the problem.

Features

A feature of the invention is the provision of a ROM patching facility which uses a plurality of small capacity PROMs to detect address words representing defective ROM address locations with the address bus having a plurality of conductors equal in number to the sum of the inputs on the PROMs.

A further feature is the provision of circuitry for paralleling the corresponding output conductors of the plurality of PROMs for providing a distinctive 1-out-of-$n$ type signal whenever an address word is received representing a defective ROM location that is to be patched.

A further feature is the provision of an encoder which is connected to the PROM output conductors, which receives each 1-out-of-n type decoder output signal, and which encodes each such signal into a binary word representing address information for an auxiliary memory.

A further feature is the provision of a small capacity auxiliary memory which stores the valid program information that is to be used when a defective ROM address word is received and detected.

A further feature is the provision of control circuitry including the encoder which responds to the reception of each decoder output signal and which, at that time, inhibits the output of the defective ROM and substitutes the currently addressed information in the auxiliary memory.

DESCRIPTION OF THE DRAWING

These and other objects, advantages, and features of the invention may be more readily understood upon a reading of the following description of an exemplary embodiment of the invention taken in conjunction with the drawing in which:

FIG. 2, 3 and 4 together disclose one possible manner in which the three decoder PROMs could be programmed to provide patches for eight different ROM address words;

FIG. 5 discloses the decimal value of the address input signals to which the decoder PROMs would respond to provide eight different address patches when programmed in the manner shown in FIG. 2, 3 and 4.

DESCRIPTION

Figure 1:
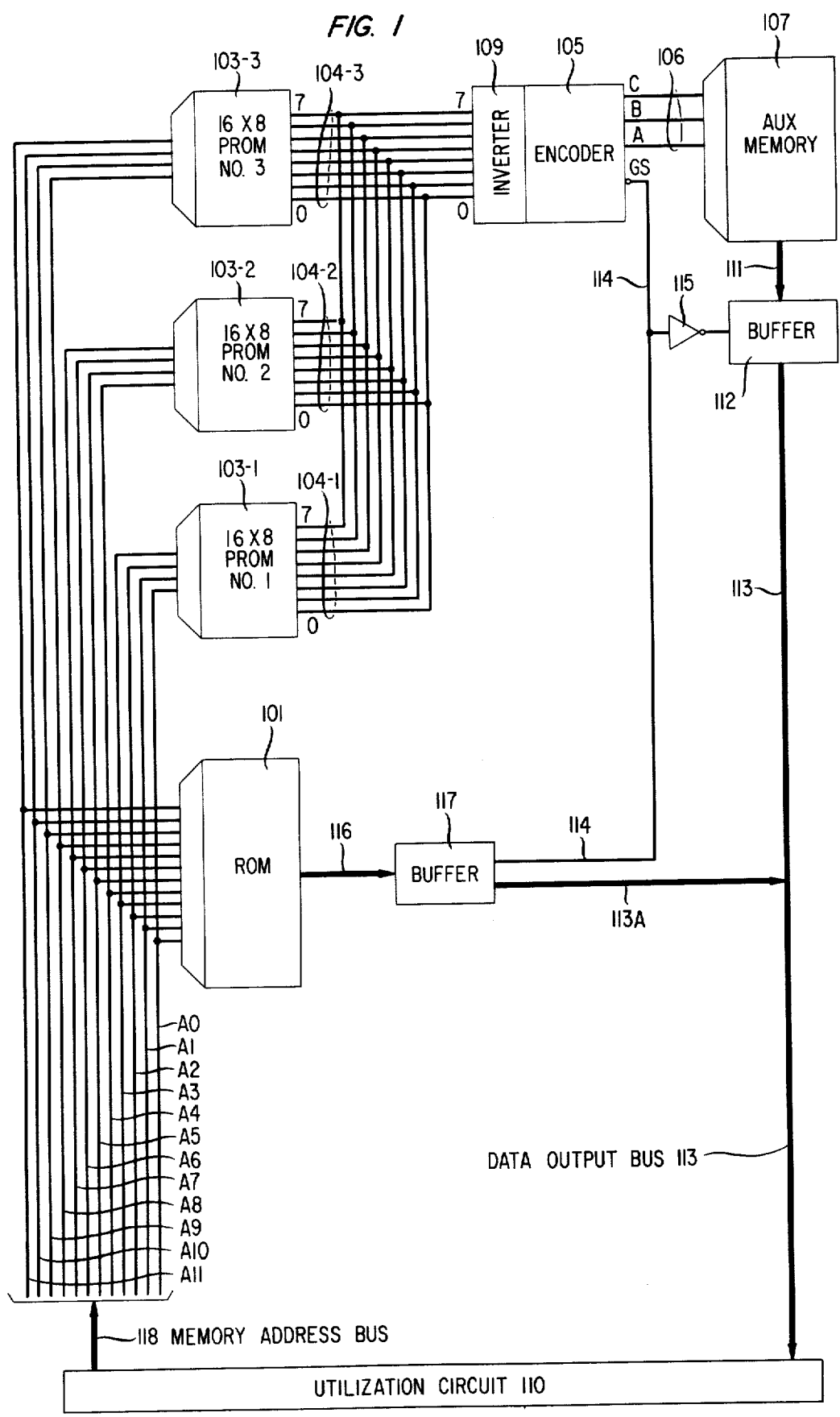
FIG. 1 discloses one possible embodiment of the invention.

A memory system embodying the invention is shown on FIG. 1 as comprising a memory address bus 118, a ROM 101 which is the main memory of the system and which is assumed to have the defective locations that are to be patched, a buffer 117 which receives the output signals from the ROM, and an output bus 113 which receives the ROM output signal via buffer 117 and extends these signals to the utilization circuit 110. Circuit 110 may comprise the remainder of the system elements, including a processor, that are associated with and/or controlled by the memory system of FIG. 1.

In normal operation, the utilization circuit 110 applies address word information to the ROM via the memory address bus 118 and receives the contents of each word read out of the ROM in response to the reception of an address word. This information is received from the ROM via path 116, buffer 117, path 113A and the data output bus 113. Buffer 117 is normally enabled by the high on its control conductor 114. During such times, the buffer effectively interconnects paths 116 and 113A signalwise.

The patching facilities provided in accordance with the invention further includes the three 16 × 8 PROMs 103-, an encoder 105 which includes inverter 109, an auxiliary member 107, and buffer 112. Each PROM 103- has four address input conductors and the four input conductors of each PROM are connected to four different ones of the A- conductors of memory address bus 118. Each PROM stores 16 8-bit words, each PROM has eight output conductors designated 0 through 7, the corresponding output conductors of the three PROMs are interconnected in parallel with each other, and they extend to a different input on encoder 105 via inverter 109.

As is subsequently discussed in connection with FIG. 2, 3, 5, the three PROMs together are programmed to detect eight different ROM address words on bus 118. Each of the eight address words is functionally associated with a unique bit order or position within each of the three PROMs. Also, each PROM output conductor is uniquely associated with a unique bit order without its PROM. For example, output conductors 0 are associated with the rightmost or least significant bit order so that when a PROM word is read out, the contents of the rightmost bit of the readout word are applied to output conductors 0.

Each of the output conductors of each PROM is functionally associated with one of the address words on bus 118 that is to be patched. Thus, output conductor 0 of each PROM is functionally associated with the first address word to be patched; and a binary 1 is written into the rightmost bit of the word location in each PROM that is accessed when the first patched address appears on bus 118. Consequently, whenever this address word is received, a binary 1 is read out of the rightmost bit of each PROM and is applied to its output conductor 0. The corresponding output conductors of the PROMs are wired in parallel and the internal circuitry of the PROMs is such that a set of paralleled output conductors can go high only when each PROM drives its output conductor of this set high in response to the storage of a binary 1 in the associated bit order of the word being read out. A binary 0 read out as a low on an output conductor of one PROM will hold the corresponding output conductors of the other two PROMs low even though these other two PROMs currently read out a 1.

In this manner, output conductor 0 of each of the three PROMs is associated with the first ROM word to be patched. The other seven output conductors of each of the PROMs are associated with seven other ROM words that are to be patched. The patching capacity of this arrangement is limited to eight ROM address words since each PROM has only eight output conductors.

From the above, it may be seen that the three PROMs together generate 1-out-of-8 type output information as each patched address is received. The encoder receives each decoder output signal, encodes it into binary, and applies the binary information as address words to the auxiliary memory 107 which may be a PROM. This binary information addresses the word in memory 107 that contains the valid program information that is to be used at this time as a substitute for that in the currently addressed defective ROM location.

The encoder 105 has a GS output terminal which is normally high but which goes low whenever the encoder receives a high from the decoder PROMs on any of its input conductors 0 through 7. The low on terminal GS is applied over conductor 114 to buffer 117 to inhibit it so that the ROM signals applied to path 116 are not extended via buffer 117 to the data output bus 113. The low on path 114 is also inverted by circuit 115 and applied as a high to enable buffer 112. This causes the auxiliary memory output signals on path 111 to be extended through buffer 112 to data output bus 113.

Let it be assumed that the eighth ROM word to be patched is received from the utilization circuit 110 and applied to address bus 118. The bits of this word specify a defective ROM location; they also specify the word in each PROM 103 that has a binary 1 stored into its leftmost bit position. Each PROM 103 reads out a binary 1 to drive output conductor 7 high when this word is received. The encoder receives this high on its input conductor 7 and encodes it into a binary 7. This binary 7 is applied via conductors 106 to the auxiliary memory 107 which accesses its word location that currently stores the good information the utilization circuit 110 requires at this time in place of that in the defective location of ROM memory 101.

The encoder now applies a low to conductor 114 to disable buffer 117 and enable buffer 112. This causes the information currently being read out of the auxiliary memory 107 to be applied to data output bus 113 and extended to the utilization circuit 103 in place of the defective information in the ROM memory.

FIGS. 2, 3 and 4 together illustrate the manner in which the three PROMs 103- could be programmed to provide eight different output patches in response to the receipt of address words specifying defective ROM locations. FIG. 2, 3 and 4 pertain to PROMs 1, 2 and 3, respectively. The left column of each FIG. specifies the patch number, the middle column indicates the address bus bits received by each PROM for each patch, the right column indicates the manner in which the PROMs are programmed to generate the eight patch signals.

With reference to FIG. 2, which illustrates the programming for PROM 1, it can be seen that the PROM 1 location associated with patch 0 is accessed upon the receipt of the binary bits 0001. From the right column of FIG. 2 it can be seen that a binary 1 is written in the rightmost bit position of this word. From FIG. 3 it can be seen that the PROM 2 location associated with patch 0 is accessed by the binary bits 0010 and that a binary 1 is stored in the rightmost bit position of this word. Similarly, on FIG. 4 it can be seen that the PROM 3 word associated with patch 0 is accessed by the address bits 0100 and that a binary 1 is stored in the rightmost bit position of this word. A binary 1 is applied by each PROM to its output conductor 0 when the address bits for patch 0 are received by the three PROMs. This drives the paralleled output conductors 0 high, and this high extends into input conductor 0 of the priority encoder where it is encoded into binary and subsequently used as address information by the auxiliary memory 107.

The remaining lines of FIGS. 2, 3 and 4 illustrate the manner in which the PROMs are programmed to generate patch information for other defective ROM address locations.

A PROM location may be programmed to have a binary 1 in a plurality of bit positions if the address bus bits that access this PROM word are associated with a plurality of ROM addresses to be patched. This is illustrated on FIG. 2 for patches 2 and 3. The address bits received by PROM 1 for both of these patches is 0010 and a binary 1 is written into bit positions 2 and 3 of the PROM 1 location accessed by bits 0010. The address bits applied to PROMs 2 and 3 are different for patches 2 and 3 and, therefore, different ROM word locations are patched even though the same 4 address bits (0010) are applied to PROM 1 for both patches.

It is apparent from the above that the three decoder PROMs can detect only eight patches. The reason for this is that each patch is associated with a different bit order and, since each PROM has only eight bit orders, only eight patches can be provided. This is true even though the 12-bit address bus 118 can receive $2^{12}$ or 4096 different address words.

The eight ROM addresses to be patched could conceivably define consecutive ROM locations. In this case, the contents of PROMs 2 and 3 as shown on FIGS. 3 and 4, could be a 1 in all bit orders of one location in each PROM and the four address bits applied to these two PROMs to access this word would be identical for all eight patches. The contents of PROM 1 in FIG. 2 would then be 1 in the rightmost bit order for patch 0, a 1 in the next bit position for patch 1, and so on for the remaining patches, up to and including the last patch which would have a 1 in the leftmost bit order. In this case, the binary value of the four address bits applied to PROM 1 for the various patches would differ from each other by a count of 1.

Other programming arrangements could be used for the detection of other patterns of defective ROM locations. For example, it has just been discussed how the address bits of PROMs 2 and 3 could be identical for all eight patches and how only the address bits of PROM 1 would change. The same could be true with respect to any other combination of PROMs. In other words, the address bits applied to PROMs 1 and 3 could remain the same for all patches, and the address bits for only PROM 2 would change as different patched addresses are detected.

The PROM programming of FIGS. 2, 3 and 4 as well as the programming discussed in the preceding paragraphs is merely illustrative of the capabilities of the present invention. It should be appreciated that the PROMs may be programmed in any manner desired to detect the receipt of any eight different ROM addresses containing defective information.

FIG. 5 discloses the decimal value of the address signals applied to each of the three PROMs for each of the eight patches.

The three PROMs 103- and the auxiliary memory 107 may be IM5160 type devices and they are field programmable. The encoder 105 may be a TI SN74148 type device.

The PROMs apply a high potential to their output conductors to indicate an active state, the encoder responds to a low as an active signal. Thus, in order to make the PROMs and the encoder compatible, the inverter 109 is shown and its sole function is to invert the highs representing active output PROM signals to the lows required by the encoder. The inverter may be a TI SN 7406 type device. This inverter is shown as part of the encoder since it is of no significance to the present invention other than to make the PROM output signals compatible with the encoder.

What is claimed is:

1. A circuit for patching defective word locations of an unalterable memory (ROM) containing invalid information with said circuit being responsive to the receipt of ROM address words specifying said defective locations, said circuit comprising; a plurality of alterable memories (PROMs) having input conductors each of which receives the bit for a different bit order of said address words, means for applying the bit in each bit order of each of said address words to a unique input conductor of a unique one of said PROMs, a plurality of output conductors on each of said PROMs each of which is unique to a different bit order within a PROM, means for connecting in parallel the output conductors representing corresponding bit orders for each of said PROMs, means in said PROMs for uniquely associating each set of said paralleled output conductors with a different one of said ROM address words representing a defective location, said PROMs being jointly responsive to the receipt of each address word specifying a defective ROM location to apply a patch signal to the set of paralleled output conductors uniquely associated with said specified defective location, an auxiliary memory, and means responsive to said patch signal for controlling said auxiliary memory to output valid program information as a substitute for that stored in said specified defective ROM location.

2. The circuit of claim 1 in which said means for controlling comprises; means for encoding each patch signal into address information for said auxiliary memory, means for applying said address information to said auxiliary memory to access the word location in said auxiliary memory that contains the valid program information that is to be used in place of the invalid information in the ROM location associated with the address word currently applied to said PROMs.

3. The circuit of claim 2 wherein said circuit further comprises; means for applying each address word to said ROM to read out the ROM program information associated with each applied word, means for applying the program information read out of said ROM to a data output bus, means responsive to said patch signal for applying the output information from said auxiliary memory to said data output bus, and further means responsive to said patch signal for preventing said ROM from applying to said output bus the invalid information in said currently addressed defective ROM location.

4. A circuit for patching $j$ defective word locations of an unalterable memory (ROM) containing in valid information with said circuit being responsive to the receipt of $n$ times $m$ bit ROM address words specifying said defective locations, said circuits comprising; $n$ alterable memories (PROMs) each having at least $m$ conductors each of which receives the bit for a different bit order of said address words, means for applying the bit in each bit order in each of said address words to a unique one of said $m$ input conductors on a unique one of said $n$ PROMs, $j$ output conductors on each of said PROMs each of which is unique to a different bit order within a PROM, means for forming $j$ sets of output conductors by connecting in parallel the output conductors representing corresponding bit orders for each of said PROMs, means in said PROMs for uniquely associating each set of said paralleled output conductors with a different one of said ROM address words representing a defective location, said PROMs being jointly responsive to the receipt of each address word specifying a defective ROM location to apply a patch signal to the set of paralleled output conductors uniquely associated with said specified defective location, an auxiliary memory, and means responsive to said patch signal for controlling said auxiliary memory to output valid program information as a substitute for that stored in said specified defective memory location.

5. The combination of an unalterable memory (ROM) having at least $j$ different defective word locations containing invalid program information, and a circuit for patching said $j$ defective locations in response to the receipt of memory address words specifying said locations, said combination comprising; an address bus having at least i n times $m$ conductors which are conneted to address inputs of said ROM, control means for applying address words to said bus representing locations of said ROM containing program information that is to be read out, means for receiving the program information read out of each ROM location and for extending said information to said control means, $n$ alterable memories (PROMs) each having at least $m$ address input conductors, means for connecting each conductor of said address bus to a different input conductor on said PROMs whereby each bus conductor is connected to a single input of a single PROM, $j$ output conductor on said PROMs each of which corresponds to a different bit order within a PROM, means for forming $j$ sets of output conductors by connecting in parallel the output conductors representing corresponding bit orders for each of said PROMs, means in said PROMs for uniquely associating each set of said paralleled output conductors with a different ROM address word representing a defective location, said PROMs being jointly responsive to the receipt by said bus of an address word specifying a defective ROM location to apply a patch signal to the set of said paralleled output conductors uniquely associated with said specified location, encoder means responsive to said patch signal application for generating binary address information, an auxiliary memory responsive to the generation of said binary address information for generating valid program information as a substitute for that stored in said specified defective ROM location, and means for extending said valid information to said control means.

6. The combination of claim 5 wherein said combination further comprises; means responsive to said patch signal for applying the output information from said auxiliary memory to a data output bus extending to said control means, and further means responsive to said patch signal for preventing said ROM from applying to said output bus the invalid information in said currently addressed defective location.

7. A circuit for detecting the receipt of $j$ different $n$ times $m$ bit address words, said circuit comprising; $n$ alterable memories (PROMs) each having at least $m$ input conductors each of which receives the bit for a different bit order of said address words, means for applying the bit in each bit order of each of said address words to a unique one of said $m$ input conductors of a unique one of said $n$ PROMs, $j$ output conductors on each of said PROMs each of which is unique to a different bit order within said PROMs, means for forming $j$ sets of output conductors by connecting in parallel the output conductors representing corresponding bit orders for each of said PROMs, and means in said PROMs for uniquely associating each set of said paralleled output conductors with a different one of said $j$ address words, said PROMs being jointly responsive to each receipt of said any one of said $j$ address words to apply a patch signal to the set of paralleled output conductors uniquely associated with said one address word.

8. The method of patching defective word locations containing invalid information in an unalterable memory (ROM) upon the receipt of ROM address words specifying said defective locations, said method comprising the steps of;

applying each received address word to a plurality of alterable memories (PROMs) having input conductors each of which receives the bit for a different bit order of each of said address words, the bit in each order of each of said address words being applied to a unique input conductor of a unique one of said PROMs, connecting in parallel the output conductors representing corresponding bit orders in each of said PROMs, programming said PROMs to associate each set of said paralleled output conductors with a unique one of said address words representing a defective ROM location, said programmed PROMs being jointly responsive to the receipt of an address word specifying one of said defective locations to apply a patch signal to the set of said output conductors associated with said specified location, encoding each applied patch signal into address information for an auxiliary memory, and controlling said auxiliary memory with said address information to read out valid program information from said auxiliary memory as a substitute for that stored in said specified defective ROM location.

9. The method of claim 8 in combination with the additional steps of;

applying each of said address words to said ROM, reading program information out of said ROM upon the receipt of each address word, applying the program information read out of said ROM to a data output bus extending to a system control, isolating said ROM from said output bus upon the generation of a patch signal to prevent the invalid progam information read out of said ROM from being applied to said output bus, and applying to said output bus under control of said patch signal the valid program information read out of said auxiliary memory.

10. A method of operating a memory system with said method comprising the steps of;

applying address words to an $n$ times $m$ bit address bus with said address words representing unalterable memory (ROM) locations containing program information that is to be read out of said ROM, reading program information out of said ROM upon the application of each address word to said bus, extending the program information read out of said ROM over a data output bus to a system control, applying each address word applied to said address bus to $n$ alterable memories (PROMs) each having at least $m$ address input conductors with each conductor of said PROMs taken collectively receiving the bit for a different bit order of each of said address words, forming sets of output conductors by connecting in parallel the PROM output conductors representing corresponding bit orders in each of said PROMs, programming said PROMs to associate each set of said paralleled output conductors with a unique ROM address specifying a defective location, said PROMs being responsive to the receipt of an address word specifying a defective ROM location to apply a patch signal to the one set of said output conductors associated with said specified location, encoding said patch signal into binary address information, applying said address information to an auxiliary memory, reading out from said auxiliary memory valid program information as a substitute for that stored in said specified defective ROM location upon the receipt of said binary address information by said auxiliary memory, isolating said ROM from said output bus so that the information read out of said ROM upon the receipt of said address word specifying a defective location is not applied to said output bus, and applying over said output bus to said system control the valid information read out of said auxiliary memory upon the receipt of said encoded binary address information by said auxiliary memory.

* * * * *